US011210439B2

(12) United States Patent
Cherupalli et al.

(10) Patent No.: US 11,210,439 B2
(45) Date of Patent: Dec. 28, 2021

(54) GATE ACTIVITY ANALYSIS

(71) Applicants: Regents of the University of Minnesota, Minneapolis, MN (US); University of Illinois at Urbana-Champaign, Urbana, IL (US)

(72) Inventors: Hari Cherupalli, Minneapolis, MN (US); Rakesh Kumar, Urbana, IL (US); John Sartori, Minneapolis, MN (US)

(73) Assignees: Regents of the University of Minnesota, Minneapolis, MN (US); The Board of Trustees of the University of Illinois, Urbana, IL (US)

( * ) Notice: Subject to any disclaimer, the term of this patent is extended or adjusted under 35 U.S.C. 154(b) by 692 days.

(21) Appl. No.: 16/006,490

(22) Filed: Jun. 12, 2018

(65) Prior Publication Data

US 2018/0357344 A1    Dec. 13, 2018

Related U.S. Application Data

(60) Provisional application No. 62/518,240, filed on Jun. 12, 2017.

(51) Int. Cl.
| | | |
|---|---|---|
| *G06F 30/33* | (2020.01) | |
| *G06F 30/20* | (2020.01) | |
| *G06F 30/398* | (2020.01) | |
| *G06F 115/10* | (2020.01) | |
| *G06F 21/71* | (2013.01) | |
| *G06F 21/55* | (2013.01) | |
| *G06F 21/57* | (2013.01) | |

(52) U.S. Cl.
CPC ............ *G06F 30/20* (2020.01); *G06F 30/33* (2020.01); *G06F 30/398* (2020.01); *G06F 21/554* (2013.01); *G06F 21/577* (2013.01); *G06F 21/71* (2013.01); *G06F 2115/10* (2020.01); *G06F 2221/033* (2013.01)

(58) Field of Classification Search
CPC ...... G06F 30/30; G06F 30/33; G06F 2115/10; G06F 30/20; G06F 21/577; G06F 21/71; G06F 21/554; G06F 2221/033; G01R 31/318357
See application file for complete search history.

(56) References Cited

U.S. PATENT DOCUMENTS

| | | | | |
|---|---|---|---|---|
| 6,237,132 B1 * | 5/2001 | Dean | ...................... | G06F 30/30 716/103 |
| 7,117,458 B1 * | 10/2006 | Hurlock | ......... | G01R 31/318378 716/103 |

(Continued)

OTHER PUBLICATIONS

P. A. Beerel, C. J. Myers, T. H. Y. Meng, "Automatic Synthesis of Gate-Level Speed Independent Circuits" pp. 1-36, Dec. 1994 (Year: 1994).*

*Primary Examiner* — Kibrom K Gebresilassie
(74) *Attorney, Agent, or Firm* — Dicke, Billig & Czaja, PLLC

(57) ABSTRACT

A method for analyzing a processor design includes receiving a design for a processor and receiving an application to be executed by the processor. The method includes simulating the execution of the application on the processor based on the design to identify unexercisable gates of the processor.

6 Claims, 5 Drawing Sheets

(56) References Cited

U.S. PATENT DOCUMENTS

| | | | |
|---|---|---|---|
| 7,502,728 B1* | 3/2009 | Hurlock | G01R 31/31707 703/23 |
| 9,875,325 B2* | 1/2018 | James | G06F 30/367 |
| 10,235,485 B1* | 3/2019 | Iyer | G06F 30/34 |
| 2017/0083650 A1* | 3/2017 | Ashar | G06F 30/331 |
| 2018/0357345 A1* | 12/2018 | Cherupalli | G06F 30/20 |

* cited by examiner

GATE ACTIVITY ANALYSIS

CROSS REFERENCE TO RELATED APPLICATIONS

This application claims priority to U.S. Provisional Patent Application No. 62/518,240, filed Jun. 12, 2017, entitled "APPLICATION-SPECIFIC PROCESSOR GENERATION FROM GENERAL PURPOSE PROCESSORS" and is incorporated herein by reference.

BACKGROUND

A large class of emerging applications is characterized by severe area and power constraints. For example, wearables and implantables are extremely area- and power-constrained. Several Internet of things (IoT) applications, such as stick-on electronic labels, RFIDs, and sensors, are also extremely area- and power-constrained. Area constraints are expected to be severe also for printed plastic and organic applications.

Cost concerns drive many of the above applications to use general purpose microprocessors and microcontrollers instead of much more area- and power-efficient application-specific integrated circuits (ASICs), since, among other benefits, development cost of microprocessor IP cores can be amortized by the IP core licensor over a large number of chip makers and licensees. In fact, ultra-low-area- and power-constrained microprocessors and microcontrollers powering these applications are already the most widely used type of processing hardware in terms of production and usage, in spite of their well-known inefficiency compared to ASIC and field programmable gate array (FPGA)-based solutions. Given this mismatch between the extreme area and power constraints of emerging applications and the relative inefficiency of general purpose microprocessors and microcontrollers compared to their ASIC counterparts, there exists a considerable opportunity to make microprocessor-based solutions for these applications much more area- and power-efficient.

One big source of area inefficiency in a microprocessor is that a general purpose microprocessor is designed to target an arbitrary application and thus contains many more gates than what a specific application needs. Also, these unused gates continue to consume power, resulting in significant power inefficiency. While adaptive power management techniques (e.g., power gating) help to reduce power consumed by unused gates, the effectiveness of such techniques is limited due to the coarse granularity at which they must be applied, as well as significant implementation overheads such as domain isolation and state retention. These techniques also worsen area inefficiency.

DETAILED DESCRIPTION

Figure 1:
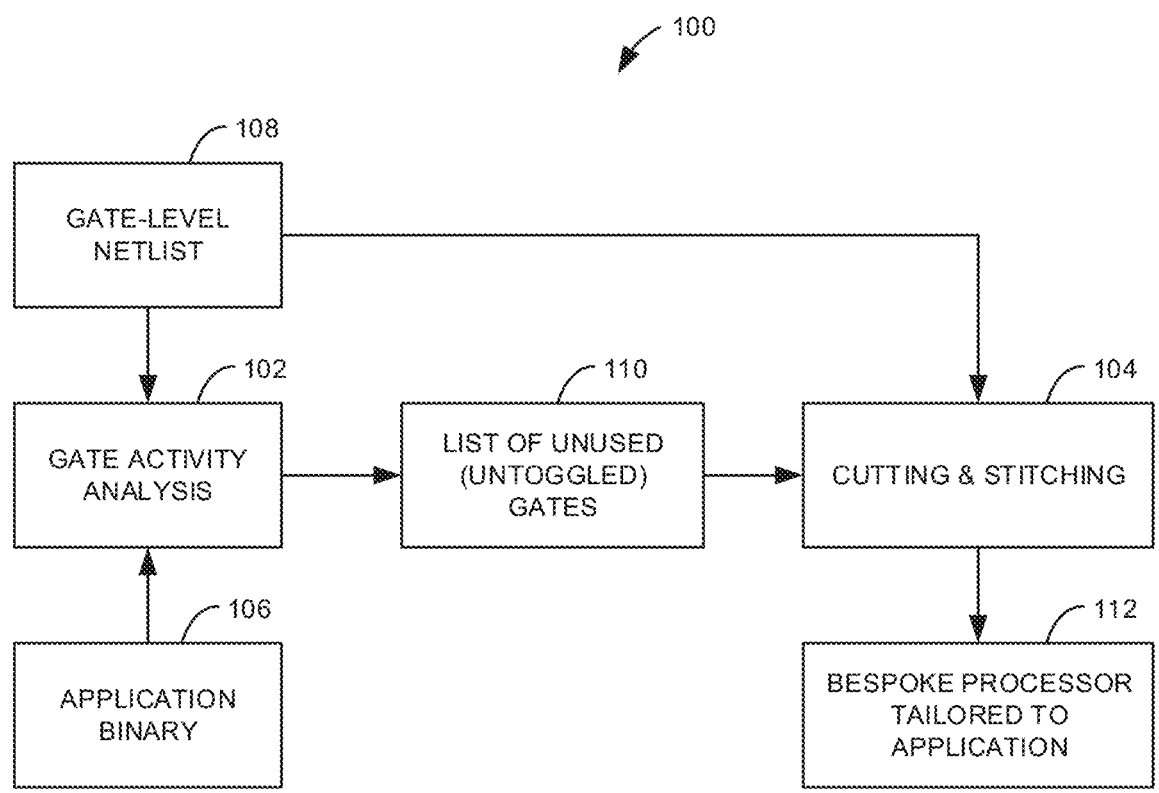
FIG. 1 is a flow diagram illustrating one example of a method for generating a bespoke processor tailored to an application.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

One approach to significantly increase the area and power efficiency of a microprocessor for a given application is to eliminate all logic in the microprocessor IP core that will not be used by the application Eliminating logic that is guaranteed to not be used by an application can produce a design tailored to the application—a bespoke processor—that has significantly lower area and power than the original microprocessor IP that targets an arbitrary application. As long as the approach to create a bespoke processor is automated, the resulting design retains the cost benefits of a microprocessor IP, since no additional hardware or software needs to be developed. Also, since no logic used by the application is eliminated, area and power benefits come at no performance cost. The resulting bespoke processor does not require programmer intervention or hardware support either, since the software application can still run, unmodified, on the bespoke processor.

In this disclosure, a system and method is disclosed to automatically generate a bespoke processor for an application out of a general purpose processor/microcontroller IP core. As used herein, the term "processor" includes any logic circuit that can execute an application. The system and method uses gate-level symbolic simulation to identify gates in the microprocessor IP that cannot be toggled by the application, irrespective of the application inputs, and automatically eliminates them from the design to produce a significantly smaller and lower power design with the same performance. In many cases, reduction in the number of gates also introduces timing slack that may be exploited to improve performance or further reduce power and area. Since the original design is pruned at the granularity of gates, the resulting method may be more effective than any approach that relies on coarse-grained application-specific customization. The disclosed method can be used either by IP licensors or IP licensees to produce bespoke designs for the application of interest. Simple extensions to the method may be used to generate bespoke processors that can support multiple applications or different degrees of in-field software programmability, debuggability, and updates.

Bespoke processors as disclosed herein reduce area and power by tailoring a processor to an application, such that a processor consists of only those gates that the application needs for any possible execution with any possible inputs. A bespoke processor still runs the unmodified application binary without any performance degradation.

An automated method may be used for generating bespoke processors. The symbolic gate-level simulation-based method may take the original microprocessor IP and application binary as input to produce a design that is functionally-equivalent to the original processor from the perspective of the target application while consisting of the minimum number of gates needed for execution.

The area and power benefits of bespoke processors may include area reductions up to 74% and power reductions up to 49% compared to a general purpose microprocessor depending upon the application. When timing slack resulting from gate removal is exploited, power reductions may increase to up to 62%.

In addition, design approaches may be used to support bespoke processors throughout the product life-cycle. These design approaches include procedures for verifying bespoke processors, techniques to design bespoke processors that support multiple known applications, and strategies to allow in-field updates in bespoke processors.

Area- and power-constrained microprocessors and microcontrollers may be the most abundant type of processor produced and used today, with projected deployment growing exponentially in the future. This explosive growth is fueled by emerging area- and power-constrained applications, such as the internet-of-things (IoT), wearables, implantables, and sensor networks. The microprocessors and microcontrollers used in these applications are typically designed to include a wide variety of functionalities to support a large number of diverse applications with different requirements. On the other hand, the embedded systems designed for these applications typically consist of one application or a small number of applications, running over and over on a general purpose processor for the lifetime of the system. Given that a particular application may only use a small subset of the functionalities provided by a general purpose processor, there may be a considerable amount of logic in a general purpose processor that is not used by an application. For a particular application, a significant fraction (around 30%-60%) of the processor's gates may not be toggled during any execution of the application. Accordingly, area and power may be significantly reduced in area- and power-constrained systems by removing logic from the processor that cannot be exercised by the application(s) running on the processor, if it can be guaranteed that removed logic will never be needed for any possible execution of the application(s).

A bespoke processor, tailored to a target application, is functionally-equivalent to the original processor when executing the application. As such, the bespoke implementation of a processor design retains all the gates from the original processor design that might be needed to execute the application. Any gate that could be toggled by the application and propagate its toggle to a state element or output port performs a necessary function and is retained to maintain functional equivalence. Conversely, any gate that can never be toggled by the application can safely be removed, as long as each fanout location for the gate is fed with the gate's constant output value for the application. Removing constant (untoggled) gates for an application may result in significant area and power savings and, unlike conventional energy saving techniques, will introduce no performance degradation (indeed, no change at all in application behavior).

FIG. 1 illustrates one example of a process 100 for tailoring a bespoke processor to a target application. The first step—input-independent gate activity analysis as indicated at 102—performs a type of symbolic simulation, where unknown input values are represented as Xs, and gate-level activity of the processor is characterized for all possible executions of the application, for any possible inputs to the application. The second phase of the bespoke processor design technique—gate cutting and stitching as indicated at 104—uses gate-level activity information gathered during gate activity analysis to prune away unnecessary gates and reconnect the cut connections between gates to maintain functional equivalence to the original design for the target application.

The set of gates that an application toggles during execution can vary depending on application inputs. This is because inputs can change the control flow of execution through the code as well as the data paths exercised by the instructions. Since exhaustive profiling for all possible inputs is infeasible, and limited profiling may not identify all exercisable gates in a processor, an analysis technique may be implemented based on symbolic simulation, that is able to characterize the gate-level activity of a processor executing an application for all possible inputs with a single gate-level simulation. During this simulation, inputs are represented as unknown logic values (Xs), which are treated as both 1s and 0s when recording possible toggled gates.

The pseudocode below describes input-independent gate activity analysis. Initially, the values of all memory cells and gates are set to Xs. The application binary (indicated at 106) is loaded into program memory, providing the values that effectively constrain which gates can be toggled during execution. During simulation, the simulator sets all inputs to Xs, which propagate through the gate-level netlist (indicated at 108) during simulation. After each cycle is simulated, the toggled gates are removed from the list of unexercisable gates (indicated at 110). Gates where an X propagated are considered as toggled, since some input assignment could cause the gates to toggle. If an X propagates to the program counter (PC), indicating input-dependent control flow, the simulator branches the execution tree and simulates execution for all possible branch paths, following a depth-first ordering of the control flow graph.

Since this simulation approach may not scale well for complex or infinite control structures which result in a large number of branches to explore, a conservative approximation may be employed that allows the analysis to scale for arbitrarily-complex control structures while conservatively maintaining correctness in identifying exercisable gates. The approximation works by tracking the most conservative gate-level state that has been observed for each PC-changing instruction (e.g., conditional branch). The most conservative state is the one where the most variables are assumed to be unknown (X). When a branch is re-encountered while simulating on a control flow path, simulation down that path can be terminated if the symbolic state being simulated is a substate of the most conservative state previously observed at the branch (i.e., the states match or the more conservative state has Xs in all differing variables), since the state (or a more conservative version) has already been explored. If the simulated state is not a substate of the most conservative observed state, the two states are merged to create a new conservative symbolic state by replacing differing state variables with Xs, and simulation continues from the conservative state. This conservative approximation technique may allow gate activity analysis to complete in a small number of passes through the application code, even for applications with an exponentially-large or infinite number of execution paths.

The result of input-independent gate activity analysis for an application is a list of all gates that cannot be toggled in any execution of the application, along with their constant values. Since the logic functions performed by these gates are not necessary for the correct execution of the binary for any input, they may safely be cut from the netlist, as long as their constant output values are preserved. Once gates that the target application cannot toggle have been identified, they are cut from the processor netlist for the bespoke design. After cutting out a gate, the netlist is stitched back together to generate the final netlist and laid-out design for the bespoke processor (indicated at 112).

| Input-independent Gate Activity Analysis Pseudocode |
| --- |
| 1. Procedure Annotate Gate-Level Netlist(app_binary, design_netlist) |
| 2. Initialize all memory cells and all gates in design_netlist to X |
| 3. Load app_binary into program memory |
| 4. Propagate reset signal |
| 5. s ← State at start of app_binary |
| 6. Table of previously observed symbolic states, T.insert(s) |
| 7. Stack of un-processed execution points, $U$ .push(s) |
| 8. mark_all_gates_untoggled(design_netlist) |
| 9. while U != ∅ do |
| 10.     e ← $U$ .pop( ) |
| 11.     while e.PC_next != X and !e.END do |
| 12.         e.set_inputs X( ) // set all peripheral port inputs to Xs |
| 13.         e' ← propagate_gate_values(e) // simulate this cycle |
| 14.         annotate_gate_activity(design_netlist,e,e') // unmark every gate toggled (or possibly toggled) |
| 15.         if e'.modifies_PC then |
| 16.             c ← T.get_conservative_state(e) |
| 17.             if e' ∉ c then |
| 18.                 T.make_conservative_superstate(c,e') |
| 19.             else |
| 20.                 break |
| 21.             end if |
| 22.         end if |
| 23.         e ← e' // advance cycle state |
| 24.     end while |
| 25.     if e.PC_next == X then |
| 26.         c ← T.get_conservative_state(e) |
| 27.         if e ∉ c then |
| 28.             e' ← T.make_conservative_superstate(c,e) |
| 29.             for all a ∈ possible_PC_next_vals(e') do |
| 30.                 e'' ← e.update_PC_next(a) |
| 31.                 $U$ .push(e'') |
| 32.             end for |
| 33.         end if |
| 34.     end if |
| 35. end while |
| 36. for all g ∈ design_netlist do |
| 37.     if g.untoggled then |
| 38.         annotate_constant_value(g,s) // record the gate's initial (and final) value |
| 39.     end if |
| 40. end for |

Figure 2:
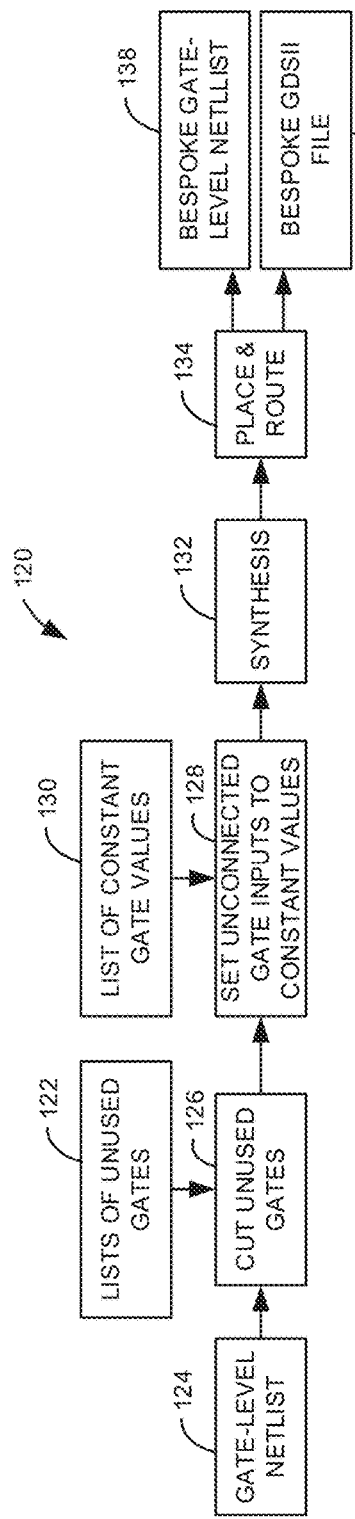
FIG. 2 is a flow diagram illustrating one example of a method for cutting and stitching.

FIG. 2 illustrates one example of a method 120 for cutting and stitching a bespoke processor. First at 126, each gate on the list of unusable (untoggled) gates (indicated at 122) is removed from the gate-level netlist (indicated at 124). After removing a gate, at 128 all fanout locations that were connected to the output net of the removed gate are tied to a static voltage ('1' or '0') corresponding to the constant output value of the gate (indicated at 130) observed during simulation. Since the logical structure of the netlist has changed, the netlist is re-synthesized at 132 after cutting all unusable gates to allow additional optimizations that reduce area and power. Since some gates have constant inputs after cutting and stitching, they can be replaced by simpler gates. Also, toggled gates left with floating outputs after cutting can be removed, since their outputs can never propagate to a state element or output port. Since cutting can reduce the depth of logic paths, some paths may have extra timing slack after cutting, allowing faster, higher power cells to be replaced with smaller, lower power versions of the cells. Finally, the re-synthesized netlist is placed and routed at 134 to produce the bespoke processor layout (indicated at 136), as well as a final gate-level netlist (indicated at 138) with necessary buffers, etc. introduced to meet timing constraints.

Figure 3:
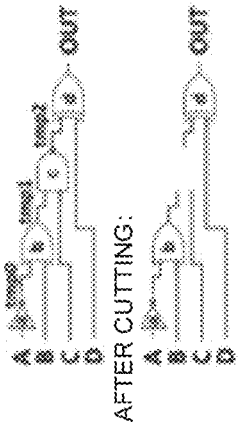
FIG. 3 illustrates one example of gate activity analysis and cutting and stitching.
Figure 3:
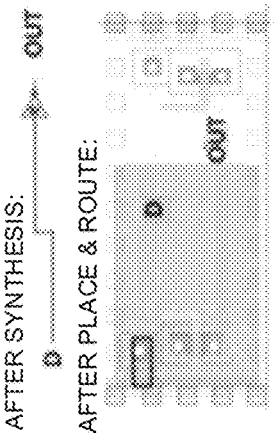

FIG. 3 illustrates one example of the bespoke design process. The left part of FIG. 3 shows input-independent gate activity analysis for a simple example (i.e., original) circuit (top right). During symbolic simulation of the target application, logical 1s, 0s, and unknown symbols (Xs) are propagated throughout the netlist. In cycle 0, A and B have known values that are propagated through gates a and b, driving tmp0 and tmp1 to '0'. The controlling value at gate c drives tmp2 to '1', despite input C being an unknown value (X). Inputs A and B are not changed by the simulation of the binary until after cycle 2, when an X was propagated to the PC (not shown) that requires two different execution paths to be explored. In the left path, input B becomes X in cycle 3, causing tmp1 to become X as well. However, since input C is a '0', tmp2 is still a '1'. In the right execution path, inputs A and B both have Xs and logic values that may toggle tmp1 in cycles 5-7, but for each of these cycles, input C is a '0', keeping tmp2 constant at '1'. Since tmp2 is never toggled during any of the possible executions of the application, gate c is marked for cutting, and its constant output value ('1') is stored for stitching. Although gate d is never toggled in cycles 0-2 or down the left execution path, it does toggle in the right execution path and thus cannot be marked for cutting. Gates a and b also toggle and thus are not marked for cutting.

Once gate activity analysis has generated a list of cuttable gates and their constant values, cutting and stitching begins. Since gate c was marked for cutting, it is removed from the netlist, leaving the input to its fanout (d) unconnected. During stitching, d's floating input is connected to c's known constant output value for the application (T). After stitching, the gate-level netlist is re-synthesized. Synthesis removes gates that are not driving any other gates (gates a and b), even though they toggled during symbolic simulation, since their work does not affect the state or output function of the processor for the application. Synthesis also performs optimizations, such as constant propagation, which replaces gate d with an inverter, since the constant controlling input of '1' to the XOR gate makes it function as an inverter. Finally, place and route produces a fully laid-out bespoke design. The bespoke processor may then be fabricated using 3D printing or another suitable fabrication technique.

While bespoke processor design involves tailoring a general purpose processor into an application-specific processor implementation, bespoke processors, which are descended from general purpose processors, still retain some programmability. Several approaches may be used for creating bespoke processors that support multiple applications.

Figure 4:
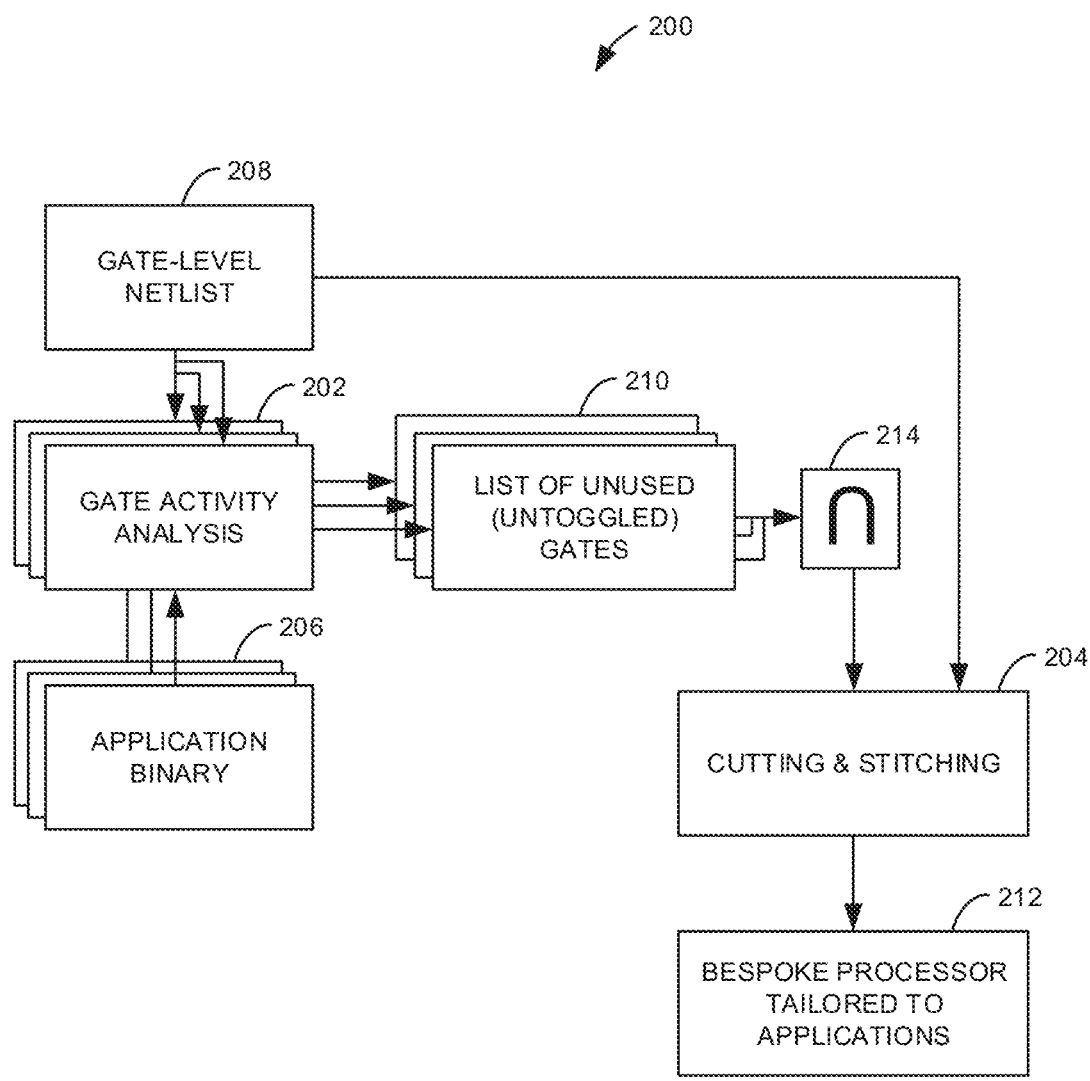
FIG. 4 is a flow diagram illustrating one example of a method for generating a bespoke processor tailored to multiple applications.

One case is when the multiple target applications are known a priori at design time. For example, a licensor or licensee that wants to amortize the expense of designing and manufacturing a chip may choose to tailor a bespoke processor to support multiple applications. In this case, the bespoke processor design method is expanded to support multiple target applications as illustrated by method 200 in FIG. 4. Given a known set of binaries (indicated at 206) that need to be supported, at 202 gate activity analysis is performed for each application using the gate-level netlist (indicated at 208), and at 204 cutting and stitching is performed for the intersection (indicated at 214) of unused gates for the applications (indicated at 210). The intersection of unused gates represents all the gates that are not used by any of the target applications. The resulting bespoke processor (indicated at 212) contains all the gates necessary to run any of the target applications. While there may be some area and power cost compared to a bespoke design for a single application due to having more gates, a bespoke processor supporting multiple applications still affords significant area and power benefits.

There may also be cases where it is desirable for a bespoke processor to support an application that is not known at design time. For example, one advantage of using a programmable processor is the ability to update the target application in the field to roll out a new software version or to fix a software bug. Tailoring a bespoke processor to a specific application may reduce its ability to support in-field updates. However, even in the case when an application was unknown at design time, it is possible for a bespoke processor to support the application. For instance, it is possible to check whether a new software version can be supported by a bespoke processor by checking whether the gates required by the new software version are a subset of the gates in the bespoke processor. Increased coverage for in-field updates may be provided by anticipating them and explicitly designing the processor to support them. As an example, this may be used to support common bug fixes by automatically creating mutants of the original software by injecting common bugs, then creating a bespoke design that supports all the mutant versions of the program. This approach may increase the probability that a debugged version of the software is supported by the bespoke design.

Sometimes an in-field update represents a significant change that is beyond the scope of a simple code mutation. To support such updates, a bespoke processor may provide support for a small number of instruction set architecture (ISA) features that can be used to implement arbitrary computations—e.g., a Turing complete instruction (or set of instructions), in addition to the target application(s). For example, support for subneg, an example Turing complete instruction, may be added. Since the memory operand addresses and the branch target are assumed to be unknown values (Xs), a binary that characterizes the behavior of subneg can be co-analyzed with the target application binary to tailor a Turing complete bespoke processor that supports the target application natively and can handle arbitrary updates, possibly with some area, power, and performance overhead.

Bespoke processors have fewer gates, lower area, and lower power than their general purpose counterparts. Additional power savings may be possible when cutting, stitching, and re-synthesis removes gates from critical paths, exposing additional timing slack that can be exploited for energy savings. Exposed timing slack may be used to reduce the operating voltage of the processor without reducing the frequency.

Bespoke processor designs are able to support multiple programs by including the union of gates needed to support both applications. However, supporting multiple programs may limit the extent of gate cutting and the resulting area and power benefits when the applications exercise significantly different portions of the processor. Although supporting multiple programs reduces gate count, area, and power benefits, the area and power will never increase with respect to the baseline design. In the worst case, the baseline processor can run any combination of program binaries.

In-field updates may often be deployed to fix minor correctness bugs (e.g., off-by-one errors, etc.). Many minor bug fixes may be covered by a bespoke processor designed for the original application without any modification. I.e., the mutants representing many in-field updates only use a subset of the gates in the original bespoke processor. This means that these mutants will execute correctly on the original bespoke processor tailored to the original "buggy" application. A bespoke processor will maintain some of the original general purpose processor's ability to support in-field updates. If a higher coverage of possible bugs is desired, the automatically-generated mutants may be considered as independent programs while tailoring the bespoke processor for the application. Providing support for simple in-field updates may incur a gate count overhead of between 1% and 38%. Despite this increase in gate count, total area benefits may be between 22% and 64%, while total power benefits may be between 16% and 47%. Therefore, simple in-field updates may be supported while still achieving substantial area and power benefits.

A bespoke processor tailored to a specific application may be designed to support arbitrary code updates by designing it to support a Turing complete instruction, such as subneg, or a set of instructions that support Turing completeness, in addition to any other programs it supports. For the single-application bespoke processors, the average area and power overheads to support subneg are 8% and 10%, respectively. Average area and power benefits for subneg-enhanced bespoke processors are 66% and 48% respectively.

Bespoke processors may be used for applications with ultra-low area and power constraints. Low-power processors may be the most widely-used type of processor and are also expected to power a large number of emerging applications. Such processors also tend to be simple, run relatively simple applications, and do not support non-determinism (no branch prediction and caching). This makes the symbolic simulation-based technique a good fit for such processors. The technique disclosed herein may also scale for complex processors and applications.

More complex processors contain more performance-enhancing features such as large caches, prediction or speculation mechanisms, and out-of-order execution, which introduce non-determinism into the instruction stream. Co-analysis is capable of handling this added non-determinism at the expense of analysis tool runtime. For example, by injecting an X as the result of a tag check, both the cache hit and miss paths will be explored in the memory hierarchy. Similarly, since co-analysis already explores taken and not-taken paths for input-dependent branches, it may be adapted to handle branch prediction. In an out-of-order processor, instruction ordering is based on the dependence pattern between instructions. While instructions may execute in different orders depending on the state of pipelines and schedulers, a processor that starts from a known reset state and executes the same piece of code will transition through the same sequence of states each time. Thus, modifying input-independent control flow graph (CFG) exploration to perform input-independent exploration of the data flow graph (DFG) may allow analysis to be extended to out-of-order execution.

For complex applications, CFG complexity increases. This may not be an issue for simple in-order processors (e.g., ultra-low-power processors), since the maximum length of instruction sequences (CFG paths) that must be considered is limited based on the number of instructions that can be resident in the processor pipeline at once. However, for complex applications running on complex processors, heuristic techniques may be used to improve scalability.

In a multi-programmed setting (including systems that support dynamic linking), the union of the toggle activities of all applications (caller, callee, and the relevant OS code in case of dynamic linking) to get a conservative profile of unusable gates is taken. Similarly for self-modifying code, the set of usable gates for the processor is chosen as the union of usable gate sets for all code versions. In case of fine-grained execution, any state that is not maintained as part of a thread's context is assumed to have a value of X when symbolic execution is performed for an instruction belonging to the thread. This leads to a conservative coverage of usable gates for the thread, irrespective of the behavior of the other threads.

Figure 5:
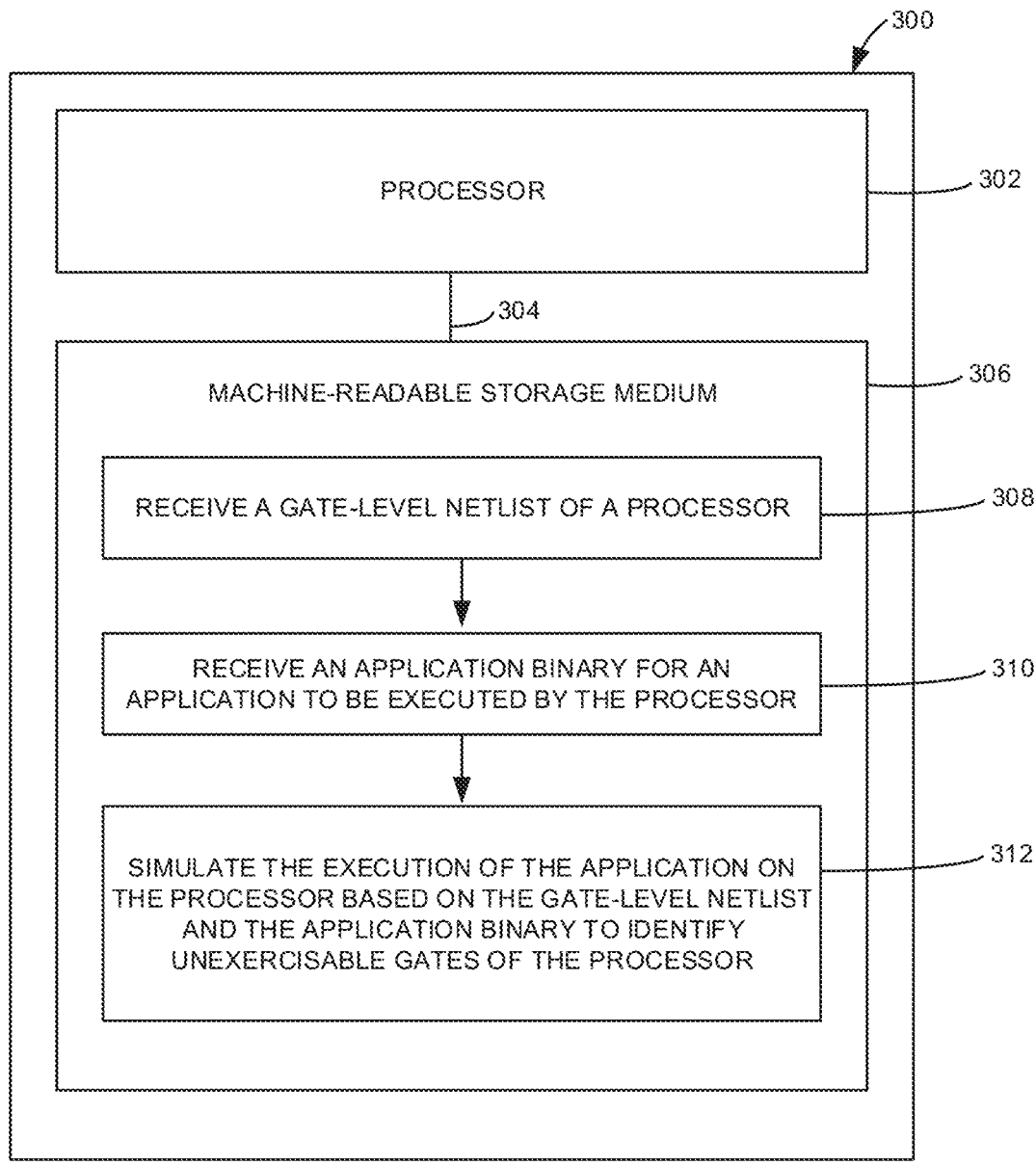
FIG. 5 is a block diagram illustrating one example of a processing system for performing gate activity analysis.

FIG. 5 is a block diagram illustrating one example of a processing system 300 for performing gate activity analysis. System 300 includes a processor 302 and a machine-readable storage medium 306. Processor 302 is communicatively coupled to machine-readable storage medium 306 through a communication path 304. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 includes one (i.e., a single) central processing unit (CPU) or microprocessor or more than one (i.e., multiple) CPU or microprocessor, and/or other suitable hardware devices for retrieval and execution of instructions stored in machine-readable storage medium 306. Processor 302 may fetch, decode, and execute instructions 308-312 to perform gate activity analysis.

Processor 302 may fetch, decode, and execute instructions 308 to receive a gate-level netlist of a processor. Processor 302 may fetch, decode, and execute instructions 310 to receive an application binary for an application to be executed by the processor. Processor 302 may fetch, decode, and execute instructions 312 to simulate the execution of the application on the processor based on the gate-level netlist and the application binary to identify unexercisable gates of the processor. Processor 302 may fetch, decode, and execute further instructions to record the constant values of each unexercisable gate.

Processor 302 may fetch, decode, and execute further instructions to simulate the execution of the application by performing symbolic simulation to identify the unexercisable gates of the processor. Processor 302 may execute the instructions to perform the symbolic simulation to: initialize a list of unexercisable gates as all gates of the gate-level netlist; initialize all inputs to the simulation to Xs, where each X represents an unknown logic value; simulate the application based on the gate-level netlist and the application binary; and remove each gate that toggles and each gate through which an X propagates during the simulation from the list of unexercisable gates.

Processor 302 may also execute the instructions to perform symbolic simulation to further: track the most conservative gate-level state that has been observed for each conditional branch encountered during the simulation; and in response to re-encountering a conditional branch while simulating on a control flow path: terminate simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merge the symbolic state being simulated with the most conservative gate-level state previously observed at the conditional branch to create an updated most conservative gate-level state for the conditional branch, and continue simulation from the updated most conservative gate-level state.

As an alternative or in addition to retrieving and executing instructions, processor 302 may include one (i.e., a single) electronic circuit or more than one (i.e., multiple) electronic circuit comprising a number of electronic components for performing the functionality of one of the instructions or more than one of the instructions in machine-readable storage medium 306. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 306 is a non-transitory storage medium and may be any suitable electronic, magnetic, optical, or other physical storage device that stores executable instructions. Thus, machine-readable storage medium 306 may be, for example, random access memory (RAM), an electrically-erasable programmable read-only memory (EEPROM), a storage drive, an optical disc, and the like. Machine-readable storage medium 306 may be disposed within system 300, as illustrated in FIG. 5. In this case, the executable instructions may be installed on system 300. Alternatively, machine-readable storage medium 306 may be a portable, external, or remote storage medium that allows system 300 to download the instructions from the portable/external/remote storage medium. In this case, the executable instructions may be part of an installation package.

Figure 6:
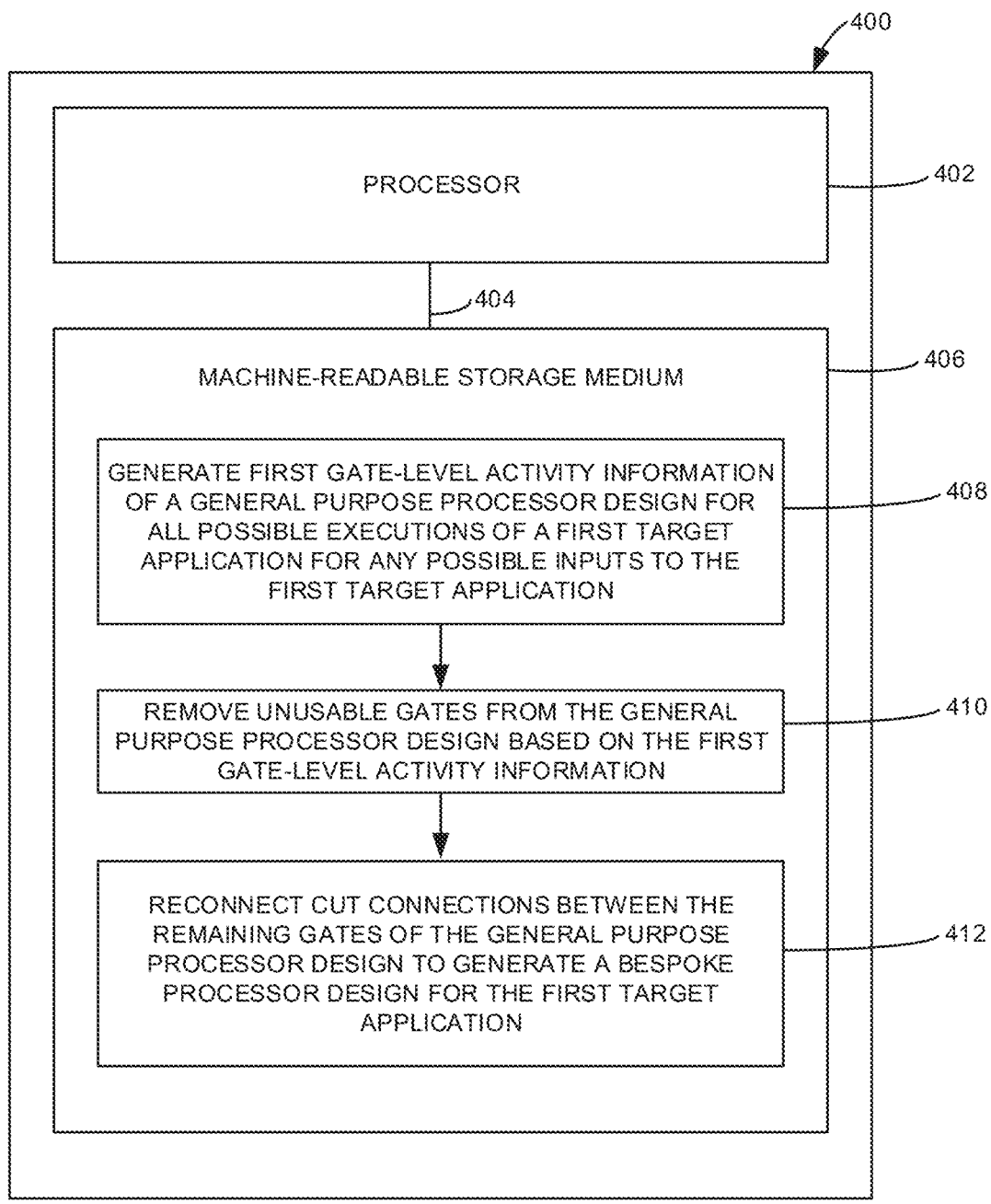
FIG. 6 is a block diagram illustrating one example of a processing system for generating a bespoke processor.

FIG. 6 is a block diagram illustrating one example of a processing system 400 for generating a bespoke processor, such as bespoke processor 112 previously described and illustrated with reference to FIG. 1. System 400 includes a processor 402 and a machine-readable storage medium 406. Processor 402 is communicatively coupled to machine-readable storage medium 406 through a communication path 404. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 includes one (i.e., a single) CPU or microprocessor or more than one (i.e., multiple) CPU or microprocessor, and/or other suitable hardware devices for retrieval and execution of instructions stored in machine-readable storage medium 406. Processor 402 may fetch, decode, and execute instructions 408-412 to generate a bespoke processor.

Processor 402 may fetch, decode, and execute instructions 408 to generate first gate-level activity information of a general purpose processor design for all possible executions of a first target application for any possible inputs to the first target application. Processor 402 may fetch, decode, and execute instructions 410 to remove unusable gates from the general purpose processor design based on the first gate-level activity information. Processor 402 may fetch, decode, and execute instructions 412 to reconnect cut connections between the remaining gates of the general purpose processor design to generate a bespoke processor design for the first target application.

Processor 402 may fetch, decode, and execute further instructions to generate the first gate-level activity information by performing symbolic simulation to identify unusable gates of the general purpose processor design. Processor 402 may execute the instructions to perform the symbolic simulation to: initialize a list of unusable gate as all gates of the general purpose processor design; initialize all inputs of the general purpose processor design to Xs, where each X represents an unknown logic value; simulate the first target application on the general purpose processor design; and remove each gate that toggles and each gate through which an X propagates during the simulation from the list of unusable gates.

Processor 402 may also execute the instructions to perform symbolic simulation to further: track the most conservative gate-level state that has been observed for each conditional branch encountered during the simulation; and in response to re-encountering a conditional branch while simulating on a control flow path: terminate simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merge the symbolic state being simulated with the most conservative gate-level state previously observed at the conditional branch to create an updated most conservative gate-level state for the conditional branch, and continue simulation from the updated most conservative gate-level state.

Processor 402 may fetch, decode, and execute further instructions to generate a list of unusable gates based on the first gate-level activity information; remove each gate on the list of unusable gates from a gate-level netlist of the general purpose processor design; tie all fanout locations that were connected to the output net of each removed gate to a static voltage corresponding to the constant output value of the gate observed while generating the first gate-level activity information; re-synthesize the gate-level netlist after removing all unusable gates; and place and route the re-synthesized netlist to produce the bespoke processor design.

Processor 402 may execute the instructions to re-synthesize the gate-level netlist to: replace gates having constant inputs by simpler gates; remove toggled gates left with floating outputs; and replace higher power cells of logic paths having extra timing slack with smaller, lower power versions of the cells. Processor 402 may fetch, decode, and execute further instructions to generate second gate-level activity information of the general purpose processor design for all possible executions of a second target application for any possible inputs to the second target application; remove unusable gates from the general purpose processor design based on the intersection of the first gate-level activity information and the second gate-level activity information; and reconnect cut connections between the remaining gates of the general purpose processor design to generate a bespoke processor design for the first target application and the second target application.

Processor 402 may fetch, decode, and execute further instructions to generate second gate-level activity information of the general purpose processor design for all possible executions of a set of instructions for any possible inputs to the set of instructions; remove unusable gates from the general purpose processor design based on the intersection of the first gate-level activity information and the second gate-level activity information; and reconnect cut connections between the remaining gates of the general purpose processor design to generate a bespoke processor design for the first target application and the set of instructions. In one example, the set of instructions may include a Turing complete set of instructions.

As an alternative or in addition to retrieving and executing instructions, processor 402 may include one (i.e., a single) electronic circuit or more than one (i.e., multiple) electronic circuit comprising a number of electronic components for performing the functionality of one of the instructions or more than one of the instructions in machine-readable storage medium 406. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 406 is a non-transitory storage medium and may be any suitable electronic, magnetic, optical, or other physical storage device that stores executable instructions. Thus, machine-readable storage medium 406 may be, for example, RAM, EEPROM, a storage drive, an optical disc, and the like. Machine-readable storage medium 406 may be disposed within system 400, as illustrated in FIG. 6. In this case, the executable instructions may be installed on system 400. Alternatively, machine-readable storage medium 406 may be a portable, external, or remote storage medium that allows system 400 to download the instructions from the portable/external/remote storage medium. In this case, the executable instructions may be part of an installation package.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method for analyzing a processor design, the method comprising:
   receiving, via a processing system, a design for a processor;
   receiving, via the processing system, an application to be executed by the processor; and
   simulating, via the processing system, the execution of the application on the processor for all possible executions of the application for any possible inputs to the application by performing symbolic simulation, where unknown input values are represented by symbolic values, based on the design to identify unexercisable gates of the processor,
   wherein performing the symbolic simulation comprises:
      initializing a list of unexercisable gates as all gates of a gate-level netlist of the design;
      initializing all inputs to the simulation to Xs, where each X represents an unknown logic value;
      simulating the application based on the gate-level netlist and an application binary for the application; and
      removing each gate that toggles and each gate through which an X propagates during the simulation from the list of unexercisable gates, and
   wherein performing the symbolic simulation further comprises:

tracking the most conservative gate-level state that has been observed for each conditional branch encountered during the simulation; and in response to re-encountering a conditional branch while simulating on a control flow path;

terminating simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merging the symbolic state being simulated with the most conservative gate-level state previously observed at the conditional branch to an updated most conservative gate-level state for the conditional branch, and continuing simulation from the updated most conservative gate-level state.

2. The method of claim 1, further comprising:
recording the constant values of each unexercisable gate.

3. A system comprising:
a machine readable storage medium storing instructions; and
a processor to execute the instructions to:
  receive a gate-level netlist of a processor;
  receive an application binary for an application to be executed by the processor; and
  simulate the execution of the application on the processor for all possible executions of the application for any possible inputs to the application by performing symbolic simulation, where unknown input values are represented by symbolic values, based on the gate-level netlist and the application binary to identify unexercisable gates of the processor,
wherein the processor executes the instructions to perform the symbolic simulation to:
  initialize a list of unexercisable gates as all gates of the gate-level netlist;
  initialize all inputs to the simulation to Xs, where each X represents an unknown logic value;
  simulate the application based on the gate-level netlist and the application binary; and
  remove each gate that toggles and each gate through which an X propagates during the simulation from the list of unexercisable gates, and
wherein the processor executes the instructions to perform symbolic simulation to further;
track the most conservative gate-level state that has been observed for each conditional branch encountered during the simulation; and
in response to re-encountering a conditional branch while simulating on a control flow path;
  terminate simulation down the control flow path in response to the symbolic state being simulated being a substate of the most conservative gate-level state previously observed at the conditional branch; and
  in response to the symbolic state being simulated not being a substate of the most conservative gate-level state previously observed at the conditional branch, merge the symbolic state being simulated with the most conservative gate-level state previously observed at the conditional branch to create an updated most conservative gate-level state for the conditional branch, and continue simulation from the updated most conservative gate-level state.

4. The system of claim 3, wherein the processor executes the instructions to further:
record the constant values of each unexercisable gate.

5. A method for analyzing a processor design, the method comprising:
  receiving, via a processing system, a gate-level netlist of a processor;
  receiving, via the processing system, an application binary for an application to be executed by the processor;
  initializing a list of unexercisable gates as all gates of the gate-level netlist;
  initializing all inputs to the simulation to Xs, where each X represents an unknown logic value;
  simulating the application based on the gate-level netlist and the application binary;
  removing each gate that toggles and each gate through which an X propagates during the simulation from the list of unexercisable gates;
  tracking the most conservative gate-level state that has been observed for each conditional branch encountered during the simulation; and
  in response to re-encountering a conditional branch while simulating on a control flow path:
    terminating simulation down the control flow path in response to the symbolic state being simulated being a substate of the most conservative gate-level state previously observed at the conditional branch; and
    in response to the symbolic state being simulated not being a substate of the most conservative gate-level state previously observed at the conditional branch, merging the symbolic state being simulated with the most conservative gate-level state previously observed at the conditional branch to create an updated most conservative gate-level state for the conditional branch, and continuing simulation from the updated most conservative gate-level state.

6. The method of claim 5, further comprising:
recording the constant values of each unexercisable gate.

* * * * *